US011726740B2

(12) United States Patent
Edgcumbe et al.

(10) Patent No.: US 11,726,740 B2
(45) Date of Patent: Aug. 15, 2023

(54) IMMERSIVE AUDIO TOURS

(71) Applicant: GOOGLE LLC, Mountain View, CA (US)

(72) Inventors: Michael Edgcumbe, Mountain View, CA (US); Rachel Inman, Mountain View, CA (US); Kasey Klimes, Mountain View, CA (US); Anna Roth, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 83 days.

(21) Appl. No.: 17/458,816

(22) Filed: Aug. 27, 2021

(65) Prior Publication Data

US 2022/0083309 A1    Mar. 17, 2022

Related U.S. Application Data

(63) Continuation of application No. 17/018,408, filed on Sep. 11, 2020, now Pat. No. 11,137,976.

(51) Int. Cl.
*G06F 3/04817* (2022.01)
*G06F 3/0482* (2013.01)
*G06F 3/16* (2006.01)
*G06F 3/04815* (2022.01)

(52) U.S. Cl.
CPC ............ *G06F 3/165* (2013.01); *G06F 3/0482* (2013.01); *G06F 3/04815* (2013.01); *G06F 3/04817* (2013.01)

(58) Field of Classification Search
CPC .. G06F 3/165; G06F 3/04815; G06F 3/04817; G06F 3/0482; G06F 3/0484; G06F 3/0488; G06F 3/167
See application file for complete search history.

(56) References Cited

U.S. PATENT DOCUMENTS

| 6,054,991 | A * | 4/2000 | Crane | G06T 15/10 345/420 |
|---|---|---|---|---|
| 8,612,512 | B1 * | 12/2013 | Croak | H04L 65/1089 709/203 |
| 2011/0173565 | A1 * | 7/2011 | Ofek | G06T 5/50 715/781 |
| 2012/0242698 | A1 * | 9/2012 | Haddick | G06Q 30/02 345/633 |
| 2020/0314592 | A1 * | 10/2020 | Dunn, Jr. | H04W 4/80 |
| 2022/0122328 | A1 * | 4/2022 | Giovannetti | A63F 13/73 |

* cited by examiner

*Primary Examiner* — Michael Roswell
(74) *Attorney, Agent, or Firm* — Marshall, Gerstein & Borun LLP

(57) ABSTRACT

To provide audio information regarding locations within a geographic area, a client device provides an interactive three-dimensional (3D) display of panoramic street level imagery for a geographic area via a user interface. The panoramic street level imagery includes one or more landmarks. The client device receives a request for audio information describing a selected landmark within the interactive 3D display, and obtains the audio information describing the selected landmark from a server device in response to the request. Then the client device automatically presents the received audio information describing the selected landmark.

17 Claims, 9 Drawing Sheets

IMMERSIVE AUDIO TOURS

CROSS-REFERENCE TO RELATED APPLICATIONS

This application is a continuation of and claims priority to U.S. application Ser. No. 17/018,408, filed on Sep. 11, 2020, entitled "Immersive Audio Tours," the entire disclosure of which is hereby expressly incorporated by reference herein.

FIELD OF THE DISCLOSURE

The present disclosure relates to audio tours and, more particularly, to providing interactive audio information for landmarks presented within street level imagery.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many users request map and data for various geographic locations. Software applications executing in computers, smartphones, embedded devices, etc., generate digital maps in response to the requests. Some mapping applications allow users to visualize an area in 3D, often including 3D models of buildings and other map features.

SUMMARY

To enhance the user experience when viewing map displays, an audio tour generation system presents an interactive three-dimensional (3D) display of panoramic street level imagery for a geographic area within a mapping application. The 3D display may include user controls such as audio indicators overlaid on respective landmarks within the 3D display. When a user selects one of the audio indicators, the audio tour generation system obtains an audio clip including a set of audio information describing the selected landmark. The audio clip may include a story describing the history of the landmark, events which occurred at the landmark, the architecture for the landmark, information about the people responsible for creating the landmark, discovering the landmark, or who owned or visited the landmark, or any other suitable information describing the landmark. The audio clip may be a short audio clip (e.g., 30 seconds, a minute, two minutes, etc.), or may be for a longer duration (e.g., 15 minutes, 30 minutes, an hour, etc.). In any event, the mapping application may present the audio clip for the selected landmark when the user requests audio for the landmark via the audio indicator or another user control.

In some implementations, the mapping application may present a two-dimensional (2D) map display of a geographic area, where the 2D map display includes points of interest (POIs). For POIs where there is a stored audio clip, the 2D map display may present a first set of audio indicators overlaying the POIs on the 2D map display. In response to receiving a selection of one of the first set of audio indicators corresponding to a POI, the mapping application may present a 3D map display of panoramic street level imagery for the landmark corresponding to the POI. The 3D map display may include a second audio indicator overlaid on the landmark, which when selected, causes the mapping application to present the audio clip for the landmark.

In addition to, or alternatively to, presenting audio indicators on the 3D display of panoramic street level imagery for the user to request audio describing a particular landmark, the audio tour generation system may provide a physical mode, where the audio information for a particular landmark within the 3D display is presented in response to the user being physically proximate to the landmark in the real-world. In the physical mode, the audio tour generation system may determine the current location of the user, and when the user is within a threshold distance of a landmark having a stored audio clip, the audio tour generation system obtains the audio clip including the set of audio information describing the selected landmark, and the mapping application presents the audio clip for the selected landmark. Beneficially, by automatically presenting the audio information when a user is physically proximate to the landmark, the audio tour more closely replicates a real-world audio tour and does not require user input before presenting the audio information. A virtual audio tour is therefore provided in an efficient manner. The mapping application may present an indication of the current location of the user within the 3D display and may automatically pan the 3D display as the user's location and/or orientation changes. For example, the audio tour generation system may continually update the presented audio tour based on the user's location. That is to say, the user's current location may be obtained as the user navigates between the landmarks in the real-world, and the audio tour may be updated accordingly. This may be done periodically.

In some implementations, the audio tour generation system generates audio tours for a predetermined set of landmarks. The predetermined set of landmarks may be within the same geographic region, such that the user can engage in a walking tour of the predetermined set of landmarks by operating, for example in a physical mode. Additionally, the predetermined set of landmarks may be in different geographic regions but may share a common characteristic or category, such as having the same or similar architecture, being designed by the same person, having the same or similar size or shape, having the same or similar types of historical events which occurred at the landmarks, etc.

The audio tour generation system may present the audio tour within the mapping application by presenting user controls, or navigation directions, for the user to navigate from one landmark to the next and presenting the respective audio clips for the landmarks within the audio tour. In some implementations, the user may provide a search query for audio tours which include a particular landmark, for audio tours which include landmarks within a particular geographic region, for audio tours having a particular duration (e.g., 15 minute audio tours, 30 minute audio tours, 60 minute audio tours, etc.), or for audio tours having a particular theme (e.g., architecture, history, era, culture, etc.). The audio generation system may then identify a set of audio tours in response to the search query, and the user may select one of the identified audio tours.

In particular, an example embodiment of the techniques of the present disclosure is a method for providing audio information regarding locations within a geographic area. The method includes providing an interactive three-dimensional (3D) display of panoramic street level imagery for a geographic area via a user interface, the panoramic street level imagery including one or more landmarks, receiving (e.g., via a user control), a request for audio information describing a selected landmark within the interactive 3D display, obtaining the audio information describing the selected landmark from a server device in response to the request, and automatically presenting the received audio information describing the selected landmark.

Another embodiment of these techniques is a client device for providing audio information regarding locations within a geographic area. The client device includes a speaker, a user interface, one or more processors, and a non-transitory computer-readable memory coupled to the speaker, the user interface, and the one or more processors storing instructions thereon. The instructions, when executed by the one or more processors, cause the client device to provide, via the user interface, an interactive three-dimensional (3D) display of panoramic street level imagery for a geographic area, the panoramic street level imagery including one or more landmarks, receive (e.g., via a user control), a request for audio information describing a selected landmark within the interactive 3D display, obtain the audio information describing the selected landmark from a server device in response to the request, and automatically present, via the speaker, the received audio information describing the selected landmark.

Yet another embodiment of these techniques is a non-transitory computer-readable memory storing instructions thereon. When executed by one or more processors, the instructions cause the one or more processors to: provide, via a user interface, an interactive three-dimensional (3D) display of panoramic street level imagery for a geographic area, the panoramic street level imagery including one or more landmarks. The instructions further cause the one or more processors to receive (e.g., via a user control), a request for audio information describing a selected landmark within the interactive 3D display, obtain the audio information describing the selected landmark from a server device in response to the request, and automatically present, via a speaker, the received audio information describing the selected landmark.

As the reader will understand, any and all of the examples disclosed herein can be implemented as a method, implemented on a client device, implemented by a system including a client device and a server device, and/or can be embodied as instructions stored on a transitory computer-readable memory.

DETAILED DESCRIPTION

Overview

When navigating panoramic street level imagery, users can see buildings and other landmarks as they exist in the real-world. However, the users are unable to interact with these landmarks to obtain additional information about them. The audio presentation system obtains and stores audio clips including audio information about various landmarks throughout the world. The audio information for a landmark may include a story describing the history of the landmark, events which occurred at the landmark, the architecture for the landmark, information about the people responsible for creating the landmark, discovering the landmark, or who owned or visited the landmark, or any other suitable information describing the landmark. The audio clips may be obtained from crowd-sourced data or from the Internet or other data source.

When a user presents a map display of a geographic area for example, via a mapping application, the audio presentation system provides audio indicators overlaying locations within the map display where audio information is available. Then when the user selects one of the audio indicators corresponding to a location within the map display, the mapping application may present a 3D panoramic street level view of the corresponding location. The street level view may include real-world representations of landmarks at the corresponding location, such as buildings, rock formations, parks, signs, etc. For landmarks where there is audio information describing the landmarks, the 3D panoramic street level view may include a user control overlaying the landmark, which when selected, causes the mapping application to present the audio information for the landmark.

In some implementations, a server device may obtain and store the audio clips for the landmarks. When a user requests map data for a geographic area via the client device, the server device may provide the map data along with indications of locations where audio information is available. Then when the user selects the user control to present the audio information for a landmark, the client device may request the audio information for the landmark from the server device. The server device may then provide the requested audio information to the client device which may present the audio information to the user. In this manner, the server device provides audio information for a landmark when the audio information for that landmark is specifically requested by the user. This reduces network traffic and bandwidth requirements compared to alternative systems where the server device may provide all of the audio information for a geographic area which the user may not listen to.

Example Hardware and Software Components

Figure 1:
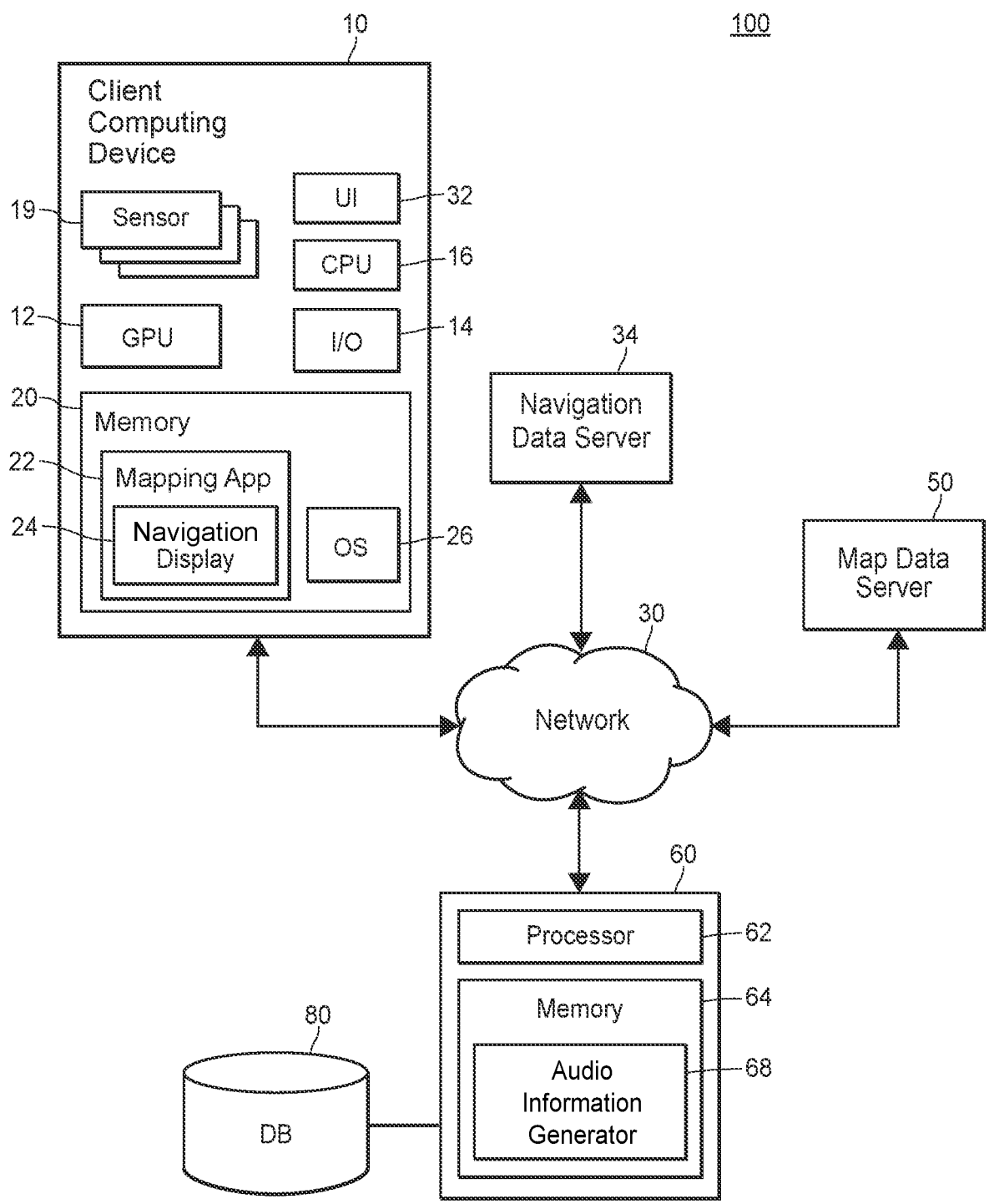
FIG. 1 illustrates a block diagram of an example communication system in which techniques for presenting audio tours can be implemented.

Referring to FIG. 1, an example communication system 100 in which an audio tour generation system can be implemented includes a client computing device 10 (also referred to herein as a "client device") configured to execute a geographic application 22, which also can be referred to as "mapping application 22." Depending on the implementation, the application 22 can display an interactive digital map, request and receive routing data to provide driving, walking, or other navigation directions, provide various geolocated content, present panoramic street level imagery of geographic areas, etc. The client device 10 may be operated by a user displaying a digital map.

In addition to the client device 10, the communication system 100 includes a server device 60 configured to provide audio information and/or audio tours to the client device 10. The server device 60 can be communicatively coupled to a database 80 that stores, in an example implementation, panoramic street level imagery of geographic areas, audio information describing landmarks within the geographic areas, landmark locations for overlaying audio controls to present the audio information describing the landmarks within the panoramic street level imagery, and/or audio tour information for providing an audio tour describing a set of landmarks.

More generally, the server device 60 can communicate with one or several databases that store any type of suitable geospatial information or information that can be linked to a geographic context. The communication system 100 also can include a navigation data server 34 that provides driving, walking, biking, or public transit directions, for example. Further, the communication system 100 can include a map data server 50 that provides map data to the server device 60 for generating a map display. The devices operating in the communication system 100 can be interconnected via a communication network 30.

In various implementations, the client device 10 may be a smartphone, a tablet computer, etc. The client device 10 may include a memory 20, one or more processors (CPUs) 16, a graphics processing unit (GPU) 12, an I/O module 14 including a microphone and speakers, a user interface (UI) 32, and one or several sensors 19 including a Global Positioning Service (GPS) module. The memory 20 can be a non-transitory memory and can include one or several suitable memory modules, such as random access memory (RAM), read-only memory (ROM), flash memory, other types of persistent memory, etc. The I/O module 14 may be a touch screen, for example. In various implementations, the client device 10 can include fewer components than illustrated in FIG. 1 or conversely, additional components. In other embodiments, the client device 10 may be any suitable portable or non-portable computing device. For example, the client device 10 may be a laptop computer, a desktop computer, a wearable device such as a smart watch or smart glasses, etc.

The memory 20 stores an operating system (OS) 26, which can be any type of suitable mobile or general-purpose operating system. The OS 16 can include application programming interface (API) functions that allow applications to retrieve sensor readings. For example, a software application configured to execute on the computing device 10 can include instructions that invoke an OS 26 API for retrieving a current location of the client device 10 at that instant. The API can also return a quantitative indication of how certain the API is of the estimate (e.g., as a percentage).

The memory 20 also stores a mapping application 22, which is configured to generate interactive digital maps and/or perform other geographic functions, as indicated above. The mapping application 22 can receive visual and/or audio data for geographic areas to include in panoramic street level imagery, and present the panoramic street level imagery and/or audio information via the audio tour display 24. The mapping application 22 can also receive audio tour information indicating a set of landmarks to include in the audio tour and/or audio information to present along with panoramic street level imagery depicting each landmark. Then the mapping application can present the audio tour including the panoramic street level imagery and/or audio information for the identified set of landmarks via the audio tour display 24. The mapping application 22 also can display driving, walking, or transit directions, and in general provide functions related to geography, geolocation, navigation, etc.

It is noted that although FIG. 1 illustrates the mapping application 22 as a standalone application, the functionality of the mapping application 22 also can be provided in the form of an online service accessible via a web browser executing on the client device 10, as a plug-in or extension for another software application executing on the client device 10, etc. The mapping application 22 generally can be provided in different versions for different respective operating systems. For example, the maker of the client device 10 can provide a Software Development Kit (SDK) including the mapping application 22 for the Android™ platform, another SDK for the iOS™ platform, etc.

In some implementations, the server device 60 includes one or more processors 62 and a memory 64. The memory 64 may be tangible, non-transitory memory and may include any types of suitable memory modules, including random access memory (RAM), read-only memory (ROM), flash memory, other types of persistent memory, etc. The memory 64 stores instructions executable on the processors 62 that make up an audio information generator 68, which can generate and provide audio information for landmarks displayed within panoramic street level imagery. The audio information generator 68 can also generate an audio tour by selecting a set of landmarks associated with a particular geographic area or theme and providing audio information to be presented when displaying corresponding landmarks within panoramic street level imagery during the audio tour.

More specifically, the audio information generator 68 may receive a request for map data for a geographic area. The audio information generator 68 may obtain map data for presenting a 2D map display of the geographic area, for example from the map data server 50. The audio information generator 68 may also obtain indications of locations within the geographic area where audio information is available. Then the audio information generator 68 may provide the map data and the location indications to the client device 10. In turn, the client device presents the 2D map display with user controls overlaying the indicated locations where audio information is available.

The audio information generator 68 may also obtain panoramic street level imagery for the locations within the geographic area where audio information is available. Additionally, for each location, the audio information generator 68 may identify a landmark location within the panoramic street level imagery where a landmark corresponding to the audio information is displayed. The client device 10 may then present a user control, such as an audio control overlaying the panoramic street level imagery at the landmark location. Furthermore, the audio information generator 68 may obtain the audio information describing the landmark and may provide the audio information to the client device 10. In this manner, in response to the user selecting the audio control overlaying the panoramic street level imagery at the landmark location or in response to the user traveling to a location which is physically proximate to the landmark location in the real world, the client device 10 presents the audio information describing the landmark.

The audio information generator 68 and the audio tour display 24 can operate as components of an audio tour generation system. Alternatively, the audio tour generation system can include only server-side components and simply provide the audio tour display 24 with instructions to present the panoramic street level views and/or corresponding audio information. In other words, audio tour generation techniques in these embodiments can be implemented transparently to the audio tour display 24. As another alternative, the entire functionality of the audio information generator 68 can be implemented in the audio tour display 24.

For simplicity, FIG. 1 illustrates the server device 60 as only one instance of a server. However, the server device 60 according to some implementations includes a group of one or more server devices, each equipped with one or more processors and capable of operating independently of the other server devices. Server devices operating in such a group can process requests from the client device 10 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

In operation, the audio tour display 24 operating in the client device 10 receives and transmits data to the server device 60. Thus, in one example, the client device 10 may transmit a communication to the audio information generator 68 (implemented in the server device 60) requesting map data for a geographic area. Accordingly, the audio information generator 68 may obtain map data for presenting a 2D map display of the geographic area, for example from the map data server 50. The audio information generator 68 may also obtain indications of locations within the geographic area where audio information is available. The audio information generator 68 may obtain the audio clips from crowd-sourced data, such as various users who submit the audio clips. Additionally, the audio information generator 68 may obtain the audio clips from online data, such as by searching the Internet or other data sources for audio clips of particular landmarks.

In some implementations, the audio information generator 68 may retrieve multiple audio clips for the same landmark. The audio information generator 68 may concatenate the audio clips to create a single audio clip for the landmark. Additionally or alternatively, the audio information generator 68 may select one of the audio clips and store the selected audio clip in association with the particular landmark. For example, the audio information generator 68 may score or rank each of the audio clips based on the length of the audio clip, the sound quality of the audio clip, the content quality of the audio clip, etc. The audio information generator 68 may the select the highest scoring or ranking audio clip as the audio clip to store in association with the particular landmark.

In other implementations, the audio information generator 68 may assign a category to each audio clip and may store each of the audio clips separately, where each audio clips is associated with a category and location in the database 80. Then the audio information generator 68 may select different audio clips for the same landmark to include in an audio tour by comparing the categories assigned to the audio clips to the theme for the audio tour. The audio clip which is assigned a category that most closely matches with the theme for the audio tour may be selected as the audio clip to include in the audio tour.

In yet other implementations, the audio information generator 68 may select a first audio clip by scoring and/or ranking the audio clips. The audio information generator 68 may also store the remaining audio clips in association with the particular landmark as secondary audio clips. When the client device 10 plays the first audio clip for the particular landmark (e.g., in response to receiving a selection of a user control), the mapping application 22 may present one or more additional user controls for providing additional information about the particular landmark. In some implementations, the mapping application 22 may present one additional user control. When the additional user control is selected, the mapping application 22 may play one of the secondary audio clips or may concatenate each of the secondary audio clips and play them as a single secondary audio clip. In other implementations, the mapping application 22 may present multiple additional user controls, where each additional user control corresponds to a category or theme. For example, a first user control may correspond to a first prompt asking the user whether she is interested in learning more about the architecture of the landmark. A second additional user control may correspond to a second prompt asking the user whether she is interested in learning more about the history of the landmark, etc. The audio information generator 68 may select the secondary the audio clip that most closely matches with the category or theme for the additional user control.

Then the audio information generator 68 stores the obtained audio clips in the database 80. The audio information generator 68 may then identify locations where audio information is available based on the audio clips stored in the database 80. Then the audio information generator 68 may provide the map data and the location indications to the client device 10. In turn, the client device presents the 2D map display with user controls overlaying the indicated locations where audio information is available.

In response to receiving a selection of a user control corresponding to a location within the geographic area where audio information is available, or in response to determining that the client device 10 is located within a threshold distance of the geographic location where audio information is available, the client device 10 may transmit a request to the audio information generator 68 for panoramic street level imagery of the selected location. Then the audio information generator 68 may obtain the panoramic street level imagery for the selected location, an indication of a landmark location for overlaying an audio control to present audio information describing the landmark within the panoramic street level imagery, and/or the audio information describing the landmark (e.g., from the database 80). The audio information generator 68 may provide the panoramic street level imagery, the landmark location indication, and/or the audio information to the client device 10.

In turn, the client device 10 presents the panoramic street level imagery with an audio control overlaying the indicated landmark location. In response to receiving a selection of the audio control or in response to determining that the client device 10 is within a threshold distance of the landmark in the real world, the client device 10 presents the audio information.

Example Map Displays and Panoramic Street Level Imagery

As mentioned above, the client device 10, via the mapping application 22, transmits a request for map data for a geographic area to the server device 60. In some implementations, the request may include a request for location information indicating locations where audio information is available. The client device 10 may transmit the request when a user opens the mapping application 22, when the user selects a particular location to view within the mapping application 22 (e.g., by entering the location into a search bar), when the user zoom or pans a map display presented by the mapping application, or when the user selects an audio tour or audio information mode. The server device 60 may then transmit the map data for the geographic area and indications of locations within the geographic area where audio information is available. As a result, the client device 10 and, more specifically, the audio tour display 24 presents a 2D map display with user controls overlaying the indicated locations where audio information is available. A 2D map display may refer to a non-panoramic road-map or satellite representation of map features, such as roads, cities, states, physical features, labels, etc., for a geographic area. The 2D map display may include a rendering of the map features in a two-dimensional plane using a Mercator projection. In another example, the 2D map display may include aerial photographs of the geographic area from a satellite which may be stitched together and rendered in a two-dimensional plane.

Figure 2:
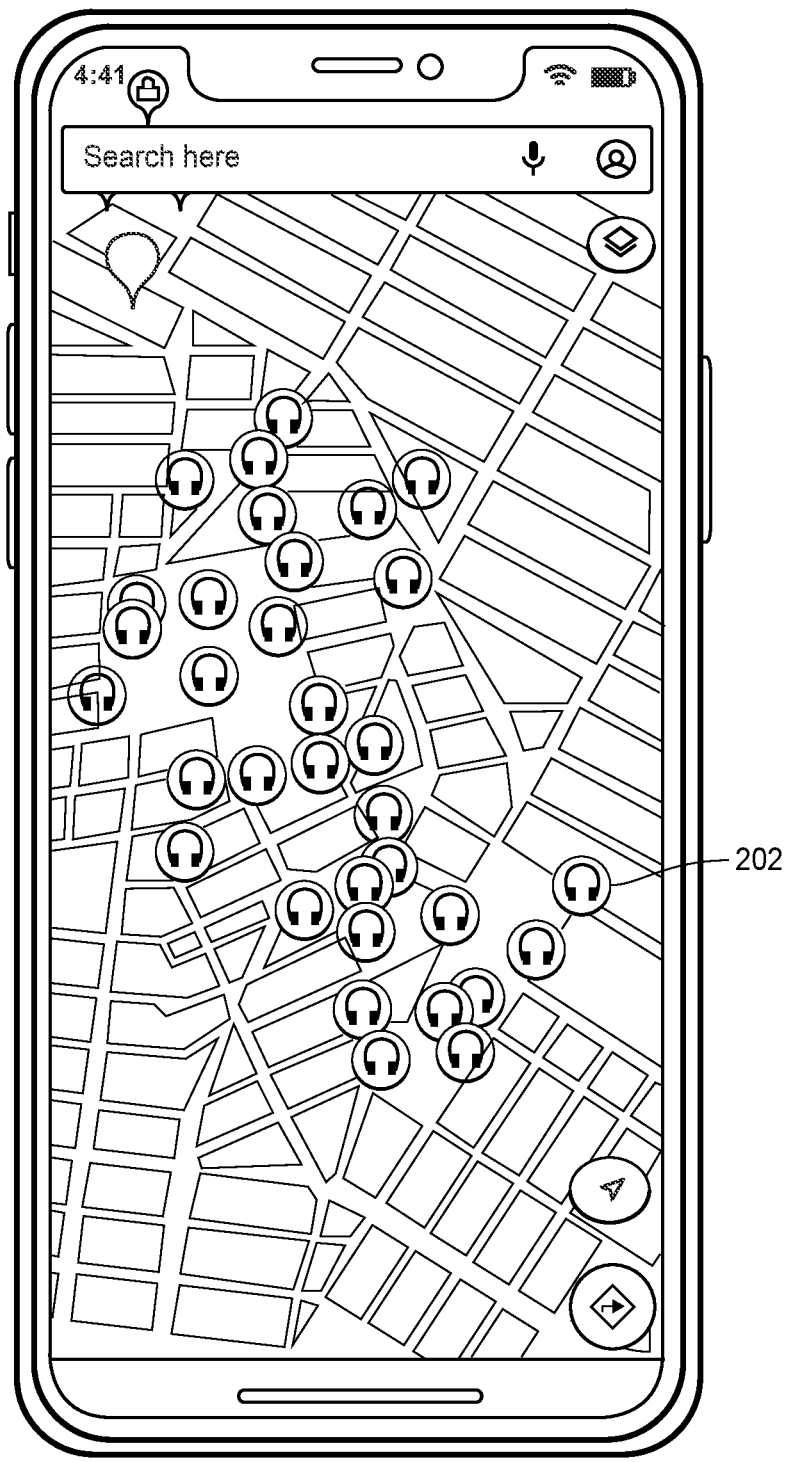
FIG. 2 illustrates an example map display of a geographic area including audio indicators overlaying locations where audio information is available.

FIG. 2 illustrates an example 2D map display 200 including user controls 202 overlaying locations where audio information is available. The user controls 202 may be icons, such as audio icons, which when selected, cause the mapping application 22 to present panoramic street level imagery of the selected locations.

Figure 3A:
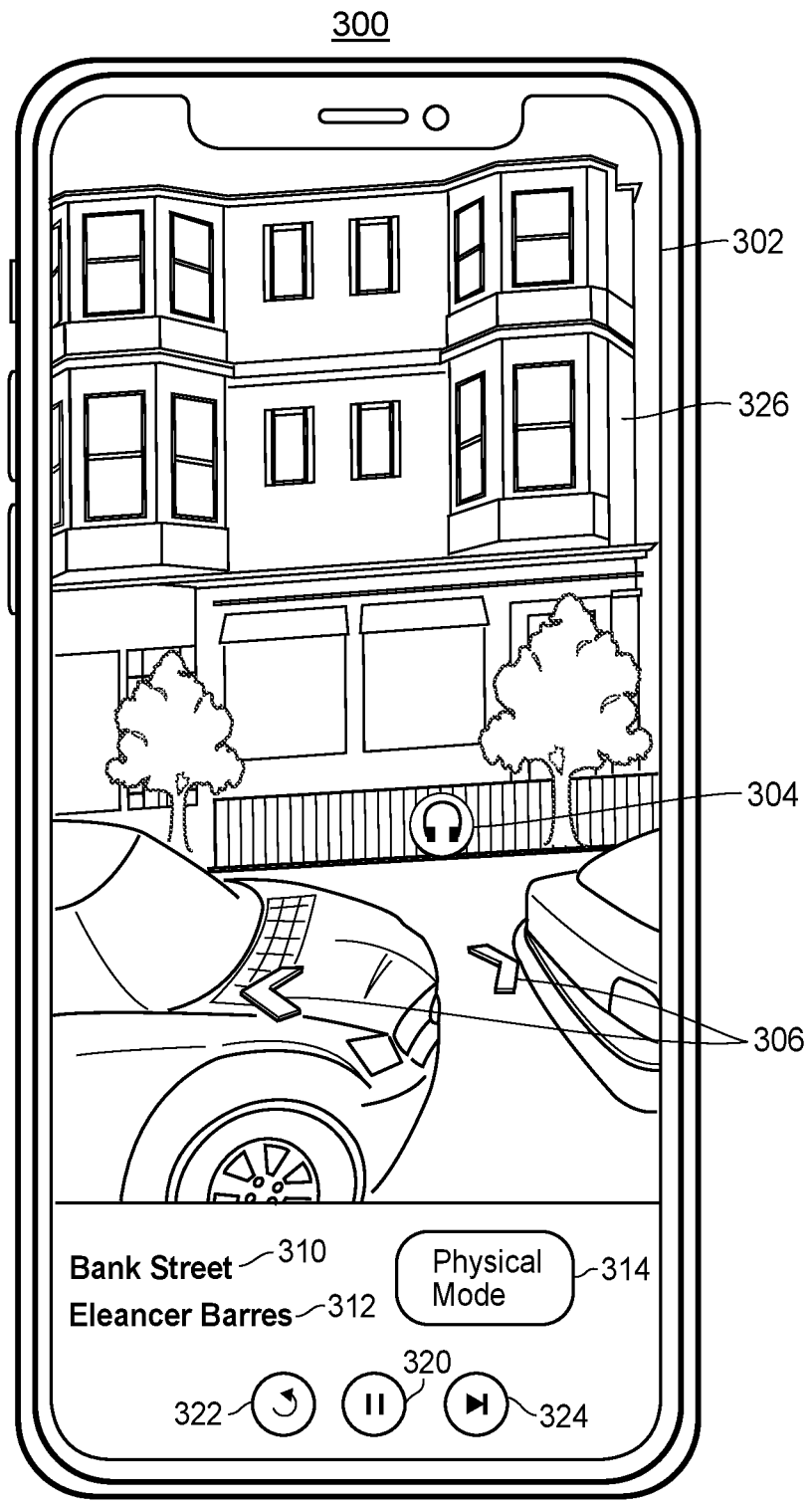
FIGS. 3A-3B illustrate example 3D panoramic street level views of geographic areas including user controls for presenting audio information overlaying landmarks displayed within the street level views.
Figure 3B:
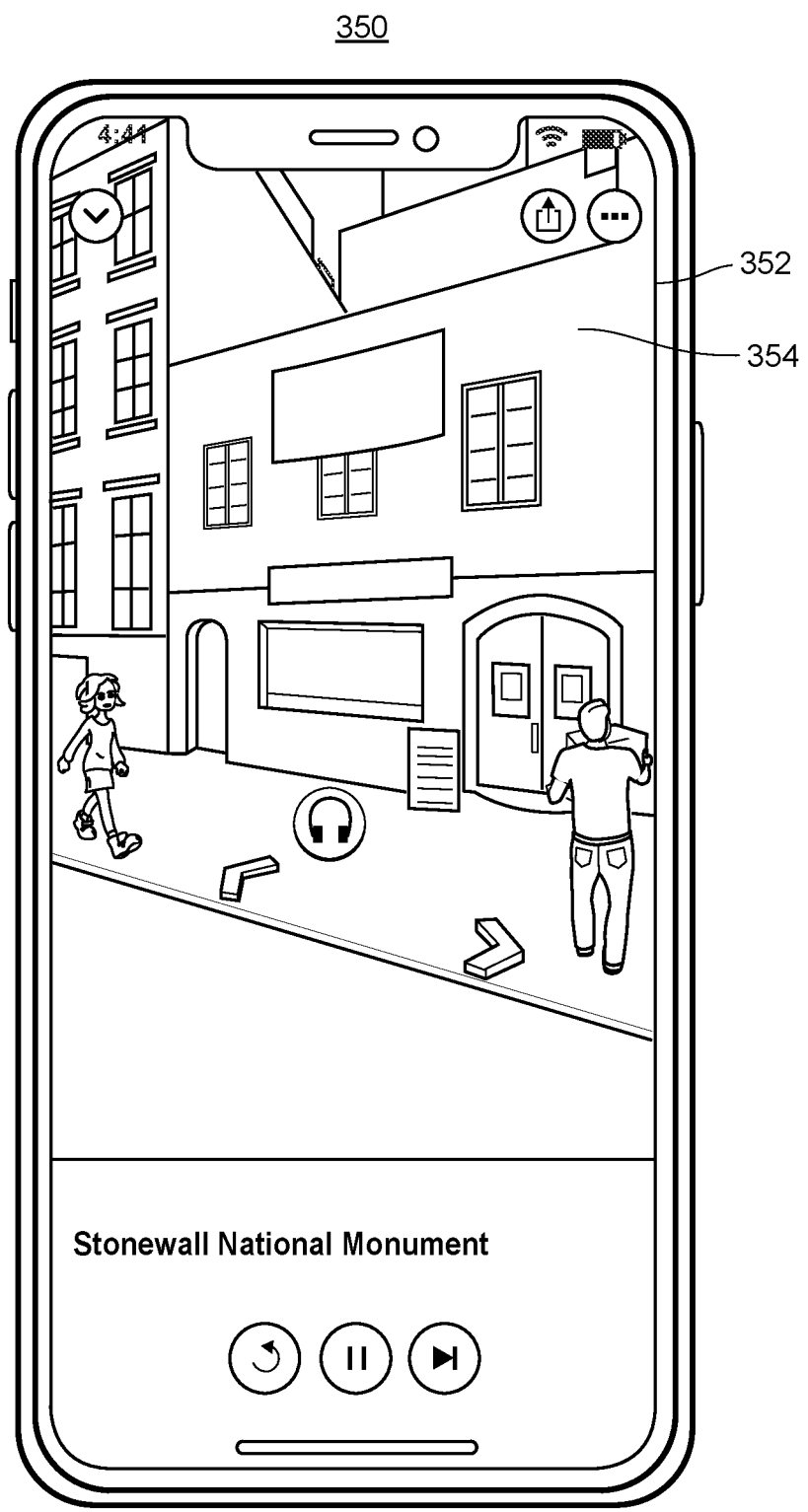

FIGS. 3A-3B show examples of 3D panoramic street level imagery of selected locations. The panoramic street level imagery may refer to a photorealistic representation of geolocated imagery including real-world objects which may be viewed by a user from a particular geographic location, such as a street level view of the user's surroundings from the user's current location to simulate the experience of walking down a street and exploring the neighborhood. The panoramic street level imagery may be captured using specialized equipment such as a high-resolution camera with a wide-angle lens or fish eye lens and/or image sensors such as LIDAR (Light Detection and Ranging) sensors to detect depth. Several photographs of geolocated imagery captured by the camera or by several cameras having narrow lenses may then be stitched together to generate the panoramic street level imagery. The panoramic street level imagery may be rendered onto a surface of a virtual cylinder to simulate the feeling that a user is in the middle of a scene, such as a rectangular cross-section of the virtual cylinder or onto any other surface of a three-dimensional solid centered around the perspective of the user. In another example, the panoramic street level imagery may include a three-dimensional rendering of real-world buildings, trees, signs, and other objects located within the geographic area represented by the panoramic view. Furthermore, the panoramic street level imagery may include any combination of photographs projected onto a virtual cylinder and three-dimensional renderings of real-world objects located within the geographic area. The panoramic street level imagery may be displayed from the perspective of a virtual camera.

In any event, FIG. 3A illustrates an example display 300 which includes 3D panoramic street level imagery 302 of a location. The location may be selected via a user control, such as the audio icon 202 shown in FIG. 2, may be selected as part of an audio tour, may be selected via user controls within the display 300, for example to pan or zoom the 3D panoramic street level imagery, or may be selected in any other suitable manner. In any event, the location may include landmarks, which may include natural objects such as mountains, rock formations, parks, etc., as well as artificial structures such as bridges, towers, tall buildings, signs, etc. As shown in FIG. 3A, the location includes a building 326. The display 300 includes a user control 304 overlaying the building 326 indicating that there is an audio clip providing information related to the building 326. The user may select the user control 304, for example via a touch-gesture or mouse click to play the audio clip.

In some implementations, after the audio clip is played in response to a selection of the user control 304, the display 300 may include one or more additional user controls for providing additional information about the building 326. In some implementations, the display 300 may include one additional user control. When the additional user control is selected, the mapping application 22 may play an additional audio clip or several additional audio clips. In other implementations, the display 300 may include multiple additional user controls, where each additional user control corresponds to a category or theme. For example, a first user control may correspond to a first prompt asking the user whether she is interested in learning more about the architecture of the landmark. A second additional user control may correspond to a second prompt asking the user whether she is interested in learning more about the history of the landmark, etc. The mapping application 22 may then present an audio clip that most closely matches with the category or theme for the additional user control.

In some implementations, the display 300 also includes a user control 314 to interact with the 3D panoramic street level imagery 302 in the physical mode. By selecting the physical mode user control 314, the mapping application 22 may play the audio clip when the mapping application 22 is open and/or the user is physically proximate to the building 326 in the real world (e.g., when the user is within a threshold distance of the building 326 or within a geo-fenced area surrounding the building 326). The mapping application 22 may determine the user's current location via the GPS module 19, and may compare the user's current location to the location of the building 326. When the user is within a threshold distance of the building 326 and/or within a geo-fenced area around the building 326, the mapping application 22 may play the audio clip automatically. The automatic playing of the audio clip may or may not require selection of the physical mode user control 314.

Still further, when the landmark is viewable within the display 300, the display 300 includes a name or description 310 of the landmark described in the audio clip and an indicator of the source of the audio clip, such as the name of the creator or narrator of the audio clip 312. The display 300 also include user controls 306 for panning the 3D panoramic street level imagery, for example by drag or swipe gestures to the right or left or by dragging a mouse or touchpad to the right or left. When the mapping application 22 is in the physical mode, the user may pan the 3D panoramic street level imagery by moving in various directions. The display 300 may then present 3D panoramic street level imagery of the user's current location which may change as the user moves throughout an area.

Additionally, the display 300 may include navigation controls 320-324 for traversing from one location to the next, for example on an audio tour. The audio tour may include a set of locations each having landmarks with audio information describing the respective landmarks. The audio tour may have a theme such as landmarks within a particular geographic region (e.g., New York City landmarks), landmarks having a particular architectural style, landmarks related to a particular historical era or historical event, landmarks related to a particular culture, etc. The navigation controls 320-324 may include a play/pause control 320 for playing and pausing the audio clip. The navigation controls 320-324 may also include a replay control 322 for replaying the audio clip from the beginning. Moreover, the navigation controls 320-324 may include a skip control 324 for skipping the audio clip for the landmark in the display 300 and moving onto the next location in the audio tour, such as the Stonewall National Monument 354 included within the 3D panoramic street level imagery 352 for another location as shown in the display 350 of FIG. 3B. The navigation controls 320-324 may also be referred to herein as a first set of user controls for traversing the set of landmarks, whereas the user controls 304 for each of the landmarks in the audio tour may be referred to herein as a second set of user controls for presenting the audio information.

In some implementations, the client device 10 may obtain an expected date and/or time of the audio tour or a current time when the user is viewing a landmark. In any event, the client device 10 may adjust style parameters for the panoramic street level imagery in accordance with the expected date and/or time of the audio tour or the current time when the user is viewing the landmark. For example, if the expected date and/or time for the audio tour or the current time when the user is viewing the landmark is at night, the panoramic street level imagery may be presented in a night view with darker features than the daytime view for the panoramic street level imagery. In another example, if the expected date and/or time for the audio tour or the current time when the user is viewing the landmark is during the winter or at a time when the weather forecast is for rain, the panoramic street level imagery may include snow or rain. In yet another example, if the expected date and/or time for the audio tour or the current time when the user is viewing the landmark is when traffic conditions are expected to be heavy, the panoramic street level imagery may include several vehicles on the roads. If the expected date and/or time for the audio tour or the current time when the user is viewing the landmark is when traffic conditions are expected to be light, the panoramic street level imagery may not include vehicles on the roads or may include a small number of vehicles on the roads. In some implementations, the client device 10 may transmit the expected date and/or time for the audio tour or the current time when the user is viewing the landmark to the server device 60. The server device 60 may then adjust the style parameters for the panoramic street level imagery by for example, obtaining a weather forecast for the expected date and/or time and adjusting the panoramic street level imagery in accordance with the estimated weather conditions, or obtaining sunrise and sunset times for the expected date and comparing the sunrise and sunset time to the expected time to determine whether the trip will occur during daylight or at night. In other words, one or more parameters of the panoramic street level imagery may be adjusted based on a date or time of the particular audio tour.

Figure 4:
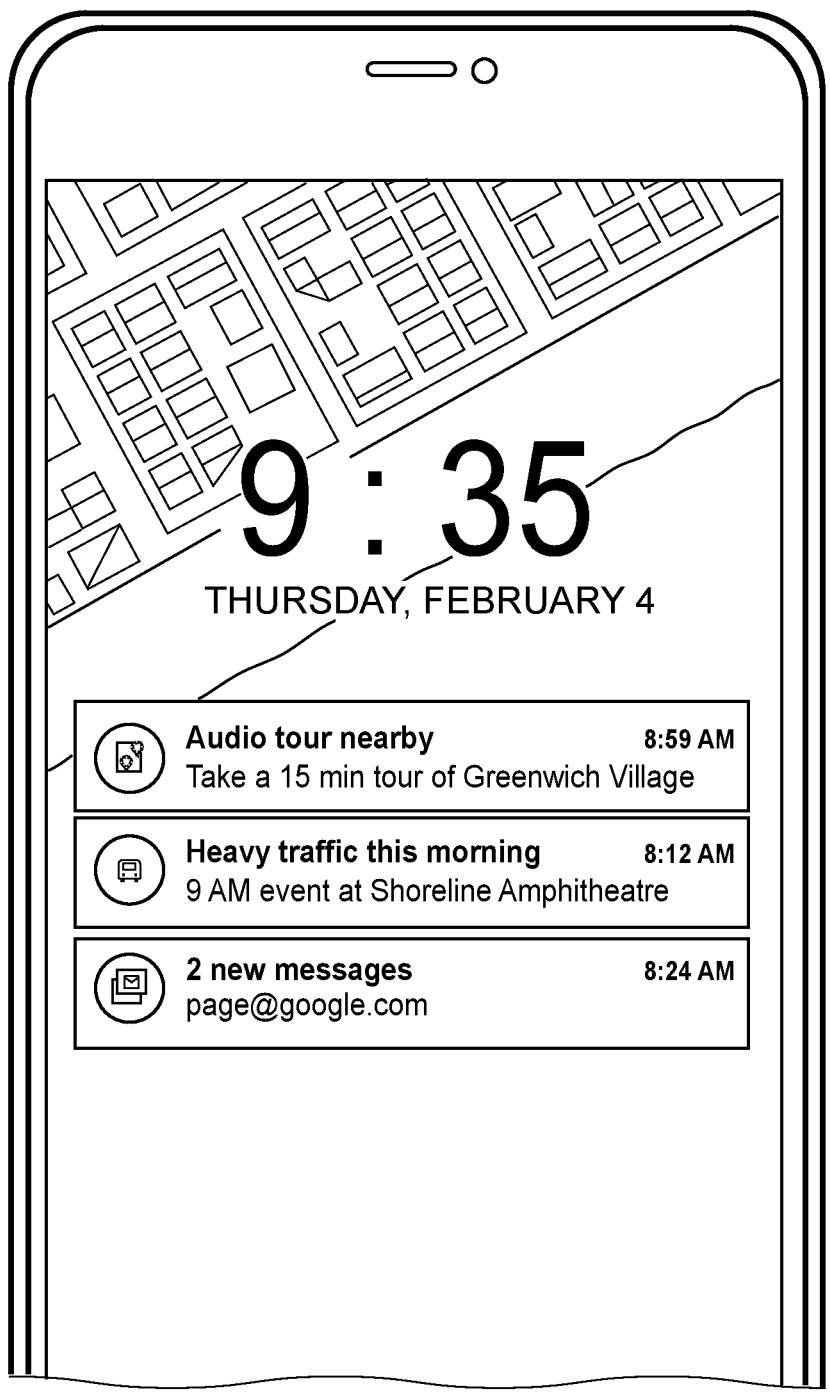
FIG. 4 illustrates an example notification display regarding an available audio tour within the user's geographic area.
Figure 5:
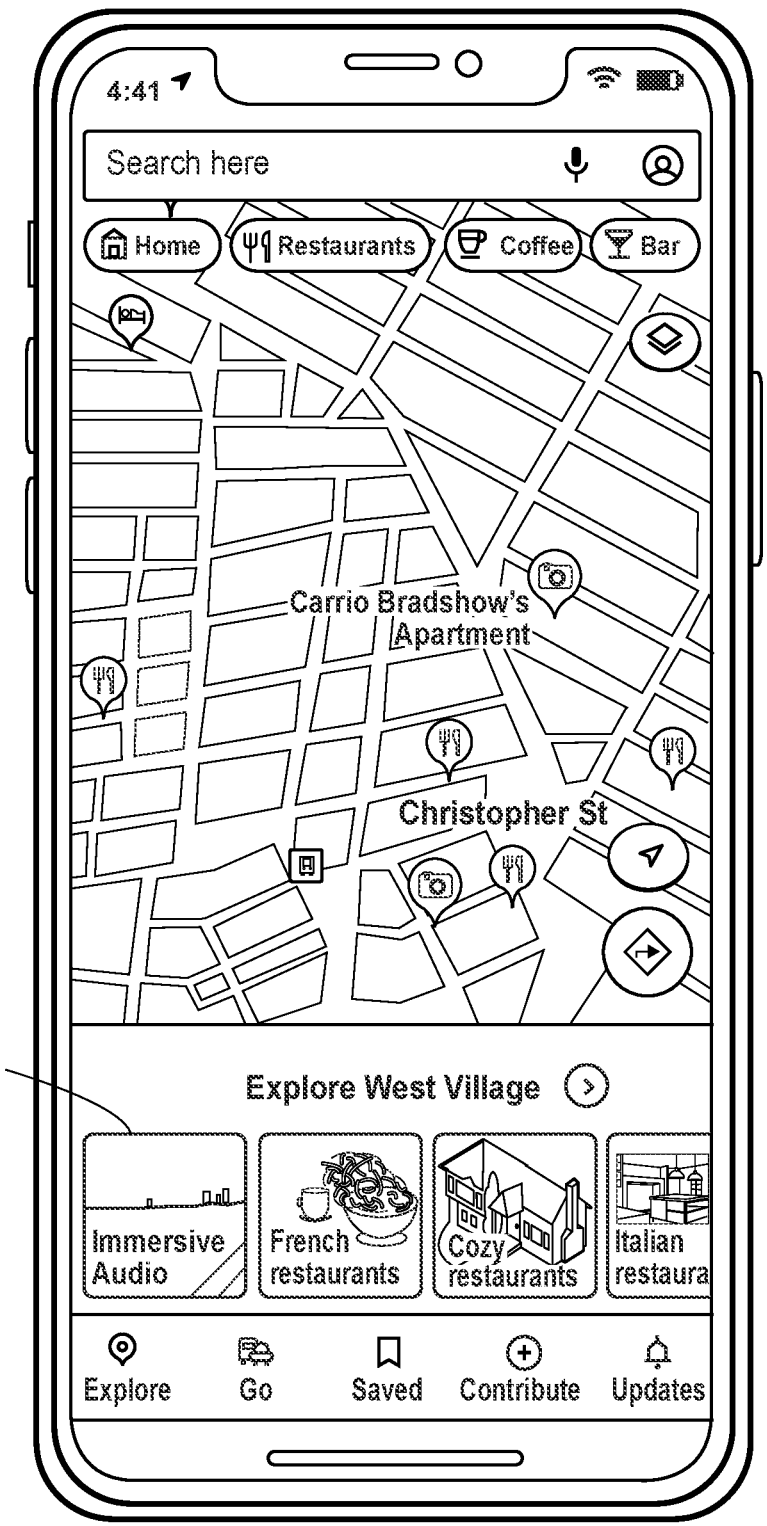
FIG. 5 illustrates an example map display of a geographic area including a user control for receiving an audio tour of the geographic area.
Figure 6:
FIG. 6 illustrates an example map display for presenting an audio tour of the geographic area.

In some implementations, for example when the user is operating in the physical mode, the server device 60 may transmit notifications to the client device 10 when the client device is in a geographic area where there is an audio tour. FIG. 4 illustrates an example notification display 400 regarding an available audio tour within the user's geographic area, Greenwich Village. For example, the notification states that there is a 15 minute audio tour of Greenwich Village. As shown in FIG. 5, the user may then launch the mapping application 22 which presents a 2D map display 500 of the user's geographic area. The 2D map display 500 includes a user control 502 for taking an audio tour of Greenwich Village. The 2D map display 500 may include the user control 502 when the notification is provided and/or when the map display 500 includes a geographic area where an audio tour is available. In response to receiving a selection of the user control 502, the mapping application 22 may present another 2D map display 600 as shown in FIG. 6 with a description of the audio tour 602 and a user control for starting the tour 604. In response to receiving a selection of the user control 604 to start the tour, the mapping application 22 may present a display similar to the display 300, as shown in FIG. 3A, which includes 3D panoramic street level imagery of a location corresponding to the first landmark on the audio tour. The display may also include the navigation controls 320-324 as shown in FIG. 3A for playing and pausing the audio clip for the first landmark, for replaying the audio clip from the beginning, and for skipping the audio clip for the first landmark and moving onto the next location in the audio tour.

In addition to presenting user controls 502 for beginning an audio tour when the map display includes a geographic area where an audio tour is available, the user may be able to search for audio tours via a search bar presented within the mapping application 22. The client device 10 may receive the audio tour search query entered by the user and provide the audio tour search query to the server device 60. Then the server device, and more specifically, the audio information generator 68 may analyze the audio tour search query to identify audio tours responsive to the audio tour search query and provide indications of the audio tours as a set of search results. The audio information generator 68 may identify a geographic area in the audio tour search query and then identify audio tours for the geographic area, audio tours including landmarks within the geographic area, audio tours having a particular theme related to the geographic area or related to landmarks within the geographic area, etc. The audio information generator 68 may also identify a theme in the audio tour search query and may filter the search results to only include those search results related to the identified theme.

Figure 7:
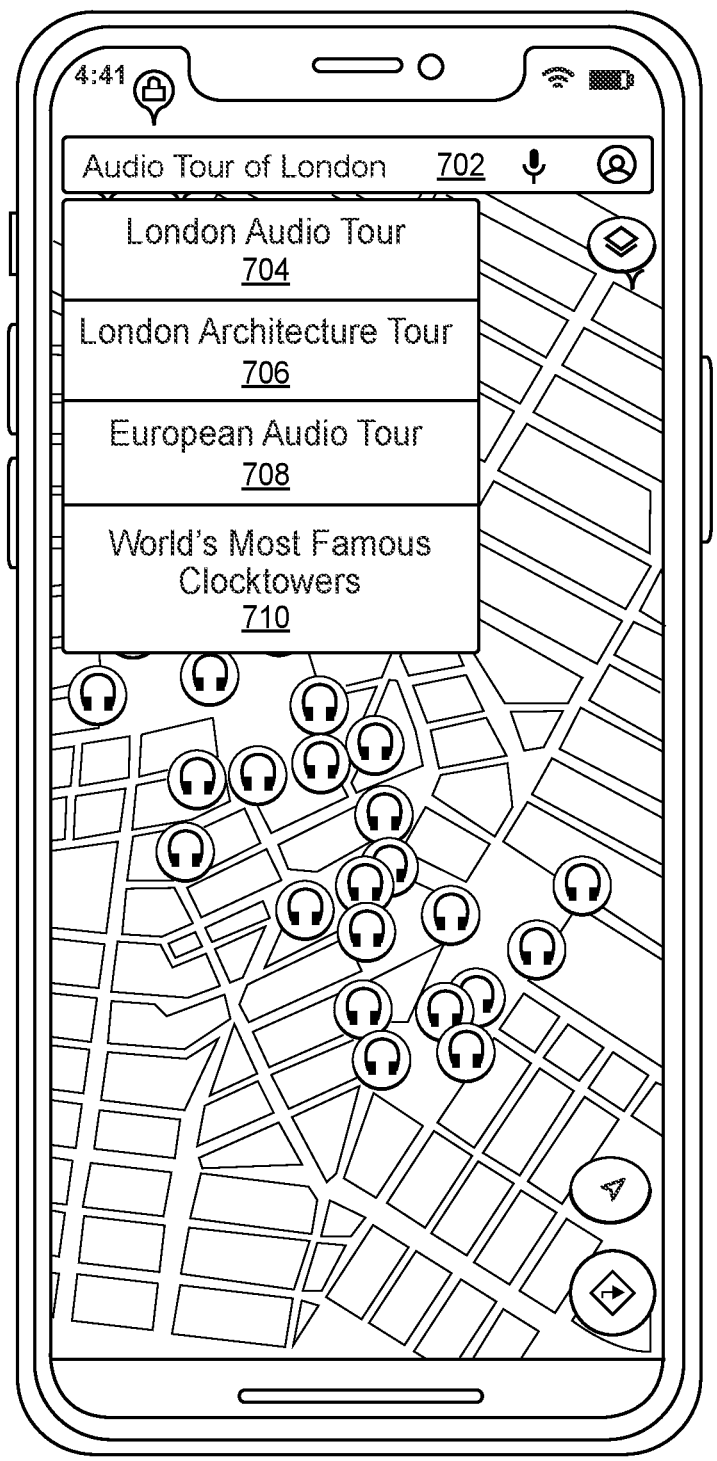
FIG. 7 illustrates an example search results display including a search bar for entering a search query regarding an audio tour and indications of a set of audio tours as search results in response to the search query.

FIG. 7 illustrates an example search results display 700 including a search bar 702 for entering a search query regarding an audio tour. The example search results display 700 also includes indications of audio tours 704-710 as search results in response to the search query. In the example shown in FIG. 7, the audio tour search query is "Audio Tour of London." The client device 10 transmits the audio tour search query to the server device 60. In turn, the audio information generator 68 analyzes the "Audio Tour of London" search query and identifies "London" as a geographic area. The audio information generator 68 then identifies audio tours from a set of stored audio tours which are related to London. The stored audio tours may be obtained from the database 80. More specifically, the audio information generator 68 may identify audio tours of London ("London Audio Tour" 704), audio tours having a particular theme related to London ("London Architecture Tour" 706), audio tours which include landmarks located in London ("European Audio Tour" 708, "World's Most Famous Clock Towers" 710), etc. The client device 10 then displays indications of each of the identified audio tours 704-710 as search results, which when selected, cause the mapping application 22 to present the selected audio tour.

In response to receiving a selection of one of the audio tours 704-710, the mapping application 22 may present a display similar to the display 300, as shown in FIG. 3A, which includes 3D panoramic street level imagery of a location corresponding to the first landmark on the selected audio tour. The display may also include the navigation controls 320-324 as shown in FIG. 3A for playing and pausing the audio clip for the first landmark, for replaying the audio clip from the beginning, and for skipping the audio clip for the first landmark and moving onto the next location in the selected audio tour.

Figure 8:
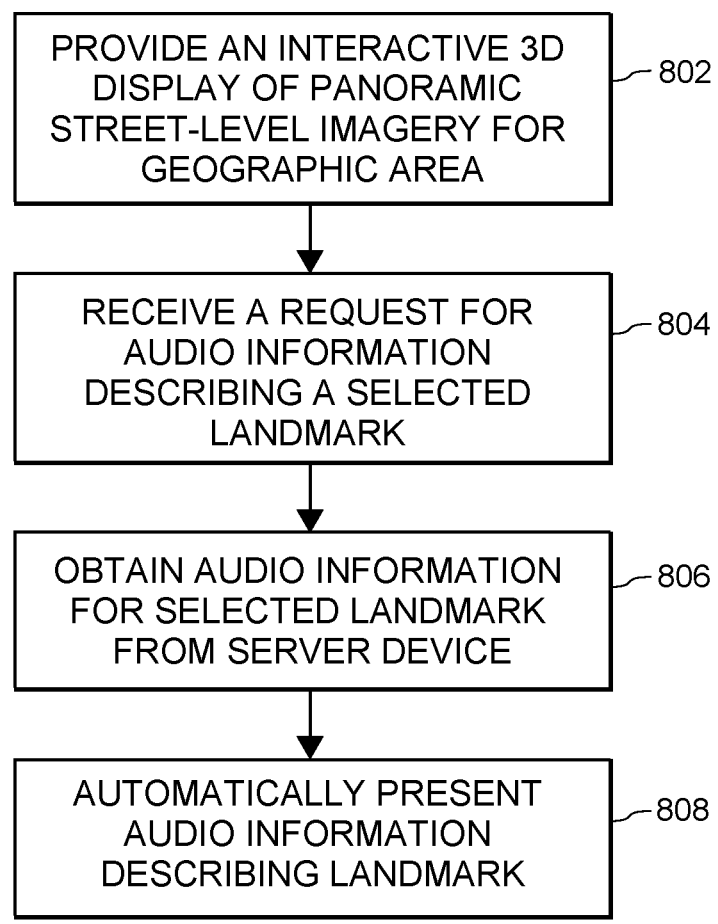
FIG. 8 is a flow diagram of an example method for providing audio information regarding locations within a geographic area, which may be implemented in a client device.

FIG. 8 illustrates an example method 800 for providing audio information regarding locations within a geographic area, which may be implemented in a client device 10. The method can be implemented in a set of instructions stored on a computer-readable memory and executable at one or more processors of the client device 10. For example, the method can be implemented by the mapping application 22, and more specifically, the audio tour display 24.

At block 802, the audio tour display 24 provides an interactive 3D display of panoramic street level imagery for a geographic area. The interactive 3D display may include landmarks within the geographic area, such as mountains, rock formations, parks, bridges, towers, tall buildings, signs, etc. For landmarks where audio information is available, the audio tour display 24 may present an audio control overlaying the landmark.

Then at block 804, the audio tour display 24 receives a request for audio information describing a landmark within the interactive 3D display. For example, the audio tour display 24 may receive a selection of a user control overlaying a landmark within the interactive 3D display. In another example, the audio tour display 24 may determine the current location of the user client device 10 and when the user is within a threshold distance of a landmark within the interactive 3D display where audio information is available or when the user is within a geo-fenced area surrounding the landmark, the audio tour display 24 may interpret this as a request for audio information, such as when the mapping application 22 is in the physical mode. The audio tour display 24 may then transmit the request for audio information describing the landmark to a server device 60, which may retrieve and provide an audio clip describing the landmark to the client device 10 (block 806). Then the client device 10 may automatically play the obtained audio clip (block 808) in response to receiving the request for audio information describing the landmark.

ADDITIONAL CONSIDERATIONS

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing audio tours through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing audio information regarding locations within a geographic area, the method comprising:
   providing, by one or more processors in a client device, an interactive three-dimensional (3D) display of panoramic street level imagery for a geographic area via a user interface, the panoramic street level imagery including one or more landmarks;
   providing, by the one or more processors, a user control for interacting with the panoramic street level imagery in a physical mode;
   receiving, by the one or more processors, a selection of the user control requesting to enter the physical mode;
   determining, by the one or more processors, that a user is within a threshold distance of a landmark within the panoramic street level imagery;
   obtaining, by the one or more processors, audio information describing the landmark; and
   automatically presenting, by the one or more processors, the audio information describing the landmark without user input regarding the landmark in response to receiving the request to enter the physical mode and determining that the user is within the threshold distance of the landmark.

2. The method of claim 1, further comprising:
providing, by the one or more processors, one or more audio indicators on respective landmarks within the interactive 3D display having audio information describing each respective landmark.

3. The method of claim 1, further comprising:
receiving, by the one or more processors, a request for an audio tour of a region;
identifying, by the one or more processors, a set of landmarks within the region for the audio tour; and
automatically presenting, by the one or more processors, audio information describing a landmark in the set of landmarks without user input regarding the landmark in response to determining that the user is within the threshold distance of the landmark.

4. The method of claim 3, wherein receiving the request for the audio tour of the region includes receiving, by the one or more processors, a search query requesting an audio tour of landmarks within a particular category; and
identifying the set of landmarks includes obtaining, by the one or more processors, the set of landmarks within the region having audio information related to the particular category.

5. The method of claim 1, further comprising:
for at least one of the landmarks within the interactive 3D display having audio information describing the landmark, providing, via the user interface, a name of the landmark and an indication of a source of the audio information when the landmark is within view of the interactive 3D display.

6. The method of claim 1, wherein the audio information is obtained from a server device that obtains a plurality of sets of audio information describing a plurality of landmarks via crowdsourced data or online data.

7. The method of claim 1, further comprising:
providing, by the one or more processors, an additional user control for obtaining additional audio information describing the landmark; and
in response to a selection of the additional user control, providing the additional audio information describing the landmark.

8. The method of claim 1, further comprising:
adjusting, by the one or more processors, style parameters for the panoramic street level imagery in accordance with a current date or time in which the interactive 3D display is presented.

9. A client device for providing audio information regarding locations within a geographic area comprising:
a speaker;
a user interface;
one or more processors; and
a non-transitory computer-readable memory coupled to the speaker, the user interface, and the one or more processors and storing instructions thereon that, when executed by the one or more processors, cause the client device to:
provide, via the user interface, an interactive three-dimensional (3D) display of panoramic street level imagery for a geographic area, the panoramic street level imagery including one or more landmarks;
provide a user control for interacting with the panoramic street level imagery in a physical mode;
receive a selection of the user control requesting to enter the physical mode;
determine that a user is within a threshold distance of a landmark within the panoramic street level imagery;
obtain audio information describing the landmark; and
automatically present, via the speaker, the audio information describing the landmark without user input regarding the landmark in response to receiving the request to enter the physical mode and determining that the user is within the threshold distance of the landmark.

10. The client device of claim 9, wherein the instructions further cause the client device to:
provide, via the user interface, one or more audio indicators on respective landmarks within the interactive 3D display having audio information describing each respective landmark.

11. The client device of claim 9, wherein the instructions further cause the client device to:
receive a request for an audio tour of a region;
identify a set of landmarks within the region for the audio tour; and
automatically present audio information describing a landmark in the set of landmarks without user input regarding the landmark in response to determining that the user is within the threshold distance of the landmark.

12. The client device of claim 11, wherein to receive the request for the audio tour of the region, the instructions cause the client device to:
receive a search query requesting an audio tour of landmarks within a particular category, wherein the set of landmarks are identified by obtaining the set of landmarks within the region having audio information related to the particular category.

13. The client device of claim 9, wherein the instructions further cause the client device to:
for at least one of the landmarks within the interactive 3D display having audio information describing the landmark, provide, via the user interface, a name of the landmark and an indication of a source of the audio information when the landmark is within view of the interactive 3D display.

14. The client device of claim 9, wherein the instructions further cause the client device to:
provide an additional user control for obtaining additional audio information describing the landmark; and
in response to a selection of the additional user control, provide the additional audio information describing the landmark.

15. A non-transitory computer-readable memory storing instructions thereon that, when executed by one or more processors, cause the one or more processors to:
provide, via a user interface, an interactive three-dimensional (3D) display of panoramic street level imagery for a geographic area, the panoramic street level imagery including one or more landmarks;
provide a user control for interacting with the panoramic street level imagery in a physical mode;
receive a selection of the user control requesting to enter the physical mode;
determine that a user is within a threshold distance of a landmark within the panoramic street level imagery;
obtain audio information describing the landmark; and
automatically present, via a speaker, the audio information describing the landmark without user input regarding the landmark in response to receiving the request to enter the physical mode and determining that the user is within the threshold distance of the landmark.

16. The non-transitory computer-readable memory of claim 15, wherein the instructions further cause the one or more processors to:
provide, via the user interface, one or more audio indicators on respective landmarks within the interactive 3D display having audio information describing each respective landmark.

17. The non-transitory computer-readable memory of claim 15, wherein the instructions further cause the one or more processors to:
receive a request for an audio tour of a region;
identify a set of landmarks within the region for the audio tour; and
automatically present audio information describing a landmark in the set of landmarks without user input regarding the landmark in response to determining that the user is within the threshold distance of the landmark.

* * * * *